(12) United States Patent
Rastogi

(10) Patent No.: US 10,673,749 B1
(45) Date of Patent: Jun. 2, 2020

(54) PEER-TO-PEER APPLICATION LAYER DISTRIBUTED MESH ROUTING

(71) Applicant: PayPal, Inc., San Jose, CA (US)

(72) Inventor: Perv K. Rastogi, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/234,875

(22) Filed: Dec. 28, 2018

(51) Int. Cl.
*H04L 12/721* (2013.01)
*H04L 12/911* (2013.01)
*H04L 29/08* (2006.01)

(52) U.S. Cl.
CPC .............. *H04L 45/44* (2013.01); *H04L 47/70* (2013.01); *H04L 67/1002* (2013.01); *H04L 67/1074* (2013.01)

(58) Field of Classification Search
CPC ..... H04L 45/44; H04L 47/70; H04L 67/1002; H04L 67/1074
See application file for complete search history.

(56) References Cited

U.S. PATENT DOCUMENTS

| | | | |
|---|---|---|---|
| 8,260,940 B1* | 9/2012 | Vosshall .................. | H04L 67/16 709/228 |
| 8,839,266 B1* | 9/2014 | Partridge ................. | G06F 13/00 719/310 |
| 10,310,762 B1* | 6/2019 | Bhatt ..................... | G06F 3/0634 |
| 10,341,412 B1* | 7/2019 | Lin ......................... | H04L 67/16 |
| 2001/0000812 A1* | 5/2001 | Waldo ................... | G06F 9/4411 709/225 |
| 2002/0184357 A1 | 12/2002 | Traversat et al. | |
| 2007/0240166 A1* | 10/2007 | Marappan ............... | G06F 9/542 719/318 |
| 2009/0150565 A1 | 6/2009 | Grossner et al. | |
| 2010/0185753 A1 | 7/2010 | Liu et al. | |
| 2011/0145376 A1 | 6/2011 | Bates et al. | |

(Continued)

OTHER PUBLICATIONS

Microservices, A sidecar for your service mesh, posted by Abhishek Tiwari, Jun. 24, 2018; https://www.abhishek-tiwari.com/a-sidecar-for-your-service-mesh/, 16 pages.

(Continued)

*Primary Examiner* — Jerry B Dennison
(74) *Attorney, Agent, or Firm* — Kowert, Hood, Munyon, Rankin & Goetzel, P.C.

(57) ABSTRACT

Techniques are disclosed relating to implementing inter-application communication in a peer-to-peer fashion via a lease-based central registry. The central registry is configured to maintain application-layer routing information and to perform load balancing of the inter-application communication. A first application of a plurality of applications may send a lease request identifying the second application to the central registry. The first application receives a lease response that identifies a specific instance of a second application within a plurality of computing nodes and includes a resource allocation defining one or more limits on inter-application communication that the first application is permitted to perform with the specific instance of the second application. Based at least in part on the lease response, the first application performs inter-application communication directly with the specific instance of the second application subject to the one or more limits without requiring routing of the inter-application communication by another entity.

20 Claims, 13 Drawing Sheets

(56) References Cited

U.S. PATENT DOCUMENTS

| | | | |
|---|---|---|---|
| 2013/0219468 A1* | 8/2013 | Bell | H04L 63/10 |
| | | | 726/4 |
| 2014/0068779 A1 | 3/2014 | Tan et al. | |
| 2014/0208173 A1* | 7/2014 | Xun | G06F 11/006 |
| | | | 714/48 |
| 2016/0134616 A1* | 5/2016 | Koushik | H04L 63/0807 |
| | | | 726/9 |
| 2018/0006935 A1* | 1/2018 | Mutnuru | H04L 45/306 |
| 2019/0065275 A1* | 2/2019 | Wong | G06F 8/65 |

OTHER PUBLICATIONS

Microsoft Azure, Sidecar pattern, Jun. 22, 2017; https://docs.microsoft.com/en-us/azure/architecture/patterns/sidecar, 4 pages.
George Miranda, "Which Service Mesh Should I Use?" The New Stack, Apr. 24, 2018; https://thenewstack.io/which-service-mesh-should-i-use/, 15 pages. [Retrieved Dec. 27, 2018].
Service Mesh, 2018 © Envoy Project Author; https://www.envoyproxy.io/learn/service-mesh, 5 pages. [Retrieved Dec. 27, 2018].
Traffic Management, Istio 1.0, 2018 Istio Authors; https://istio.io/docs/concepts/traffic-management/, 14 pages. [Retrieved Dec. 27, 2018].
Stiemerling, et al., "Application-Layer Traffic Optimization (ALTO) Deployment Considerations," Internet Engineering Task Force (IETF), Oct. 2016, 77 pages.
International Search Report and Written Opinion in PCT Appl. No. PCT/US2019/067126 dated Feb. 27, 2020, 10 pages.

\* cited by examiner

PEER-TO-PEER APPLICATION LAYER DISTRIBUTED MESH ROUTING

BACKGROUND

Technical Field

This disclosure relates generally to inter-application communication in distributed computing systems, and more specifically to mesh routing techniques for performing peer-to-peer inter-application communication.

Description of the Related Art

The core operations of many enterprises often involve performing computing on a large scale. For example, systems for distributing media content, handling communications for a large user base, performing electronic commerce, and other operations typically involve concurrently implementing numerous complex computing operations on behalf of possibly millions of users or more. Such systems may include thousands of computer systems executing even greater numbers of applications in a coordinated manner.

As enterprise computing systems scale in complexity and the number of users served, performance of inter-application communication becomes an increasingly important factor in overall system performance. In particular, existing architectures for inter-application communication may require all communication between two applications to be routed by a centralized entity. Such routing adds additional latency to inter-application communication, which reduces system performance. Moreover, centralized routing of all inter-application communications may not be particularly robust; if the centralized routing capability fails, all inter-application communications may be affected, and the entire enterprise computing system may consequently fail.

Figure 1:
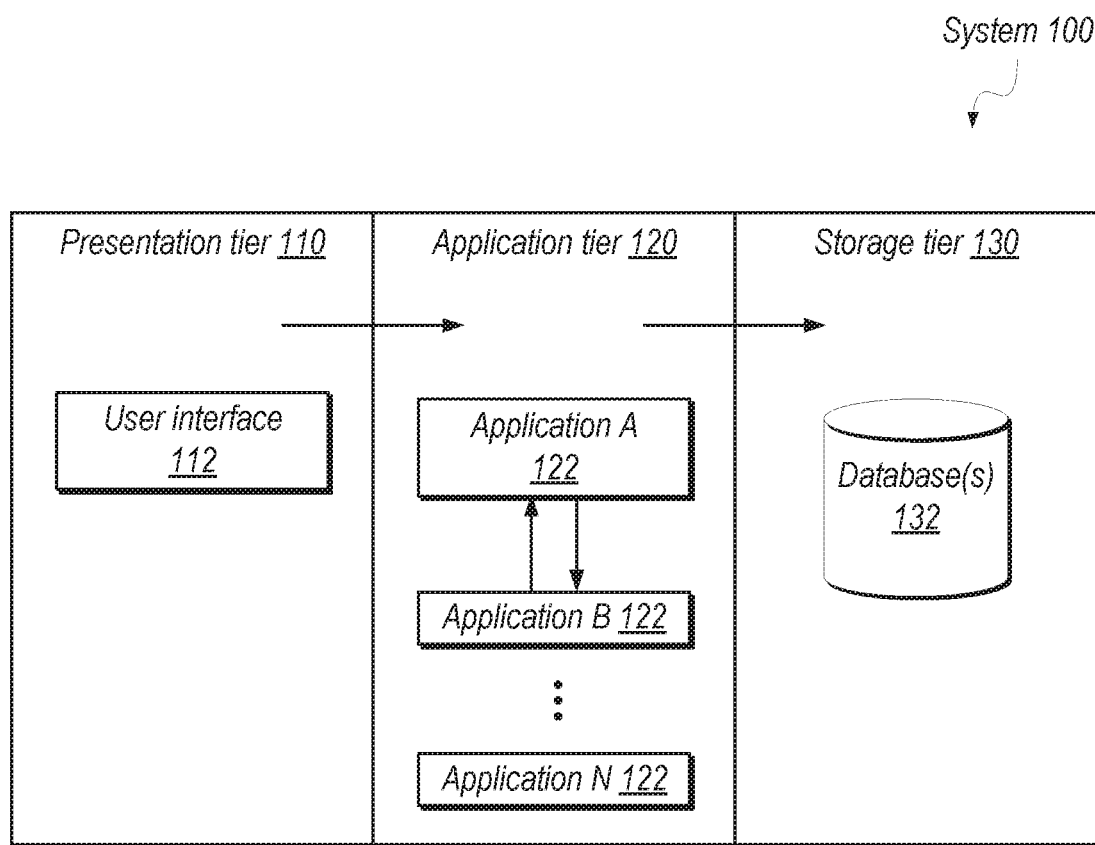
FIG. 1 is a block diagram illustrating an example of a multilayer software architecture system including three distinct layers, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing node configured to send one or more leases in response to receiving a lease request from an application" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

In the following discussion, an overview of an example enterprise computing system is first presented. Several embodiments of systems configured to perform peer-to-peer inter-application communication are then explored. Finally, an example of a computer system is discussed.

Overview of Enterprise Computing System

Generally speaking, an enterprise computing system may implement a variety of operations on behalf of a number of users. Such systems may include, for example, e-commerce systems, payment systems, and electronic content provider systems, as well as systems that serve internal enterprise clients rather than the general public. As the functionality of such a system increases, implementation of one or more processes by the system may become increasingly complex. For example, the number of users, complexity of one or more tasks, number of concurrent processes, etc. may increase for a system. Specifically, as system demands scale, a simple client-server architecture system attempting to implement one or more processes may become overloaded. Increasingly complex systems, however, may be implemented using a multitier architecture. Multitier architecture systems divide one or more tasks into different tiers to handle one or more processes. As a result, multitier architecture systems introduce flexibility into a system, allowing for independent development and configuration of different tiers within the multitier system.

FIG. 1 is a block diagram illustrating an example of a multilayer software architecture system including three distinct layers, according to some embodiments. In the illustrated embodiment, system 100 includes a presentation tier 110 configured to communicate with an application tier 120, which is configured to communicate with a storage tier 130. In turn, presentation tier 110 includes a user interface 112, application tier 120 includes a number of applications 122, and storage tier 130 includes one or more databases 132.

Generally speaking, presentation tier 110 may be configured to handle user-facing tasks. For example, presentation tier 110 may present a web interface or a different interface to one or more users via user interface 112. In another example, presentation tier 110 may implement various communication, encryption, and/or other types of protocols to send and/or receive data from one or more users.

In the illustrated embodiment, presentation tier 110 sends one or more requests to application tier 120 based on communicating with one or more users via user interface 112. In some embodiments, the one or more requests include information from the user specifying details for one or more processes. For example, a user may request a payment transaction. In this example, the presentation tier 110 sends a request to the application tier 120 with information specifying one or more of the following: amount of payment, destination of payment, user account information, destination account information, etc.

Generally speaking, application tier 120 may be configured to implement internal business logic for various operations requested by presentation tier 110. For example, the application tier may receive the user request for a payment transaction discussed above. In this example, one or more of applications 122 perform one or more steps to complete the payment transaction (e.g., identifying a destination account, user account information, etc.). In the illustrated embodiment, based on execution of applications 122, application tier 120 may in turn send requests to storage tier 130 for one or more portions of data stored within the storage tier 130.

Enterprise computing operations may generate and/or utilize significant quantities of data. Accordingly, storage tier 130 may be configured to store and retrieve relevant data on behalf of application tier 120 using the one or more databases 132. In the illustrated embodiment, storage tier 130 receives requests from application tier 120, which may include database queries to store and/or retrieve data formulated in a suitable query language (e.g., SQL). In some embodiments, based on receiving requests, the storage tier 130 stores and/or retrieves data for the one or more applications 122 of the application tier 130. In some embodiments, the storage tier 130 returns retrieved data to application tier 120, where one or more of applications 122 perform processes for one or more users based on requests received from the presentation tier 110. Note that database(s) 132 may include a plurality of storage elements or subsystems configured to store information for system 100.

It is noted that the multitier architecture of system 100 represents one possible system organization within which applications 122 may be deployed. Other system configurations that employ the inter-application communication techniques discussed below are possible, however, including simpler client-server architectures.

Centralized Routing of Inter-Application Communication

Applications within the application tier 120, discussed above with reference to FIG. 1, often need to communicate with one another to process one or more requests received at the presentation tier 110. For example, a first application 122 handling a user purchase transaction may need to interact with a second application 122 which verifies the identity of the user. In large-scale systems, however, there may be numerous instances of the second application available for the first application to communicate with. For example, in order to process multiple transactions concurrently, many instances (e.g., copies) of particular applications 122 may be deployed within a system. In typical systems, applications may not communicate directly, but instead communicate through an external entity that facilitates interactions between one or more applications, such as an application-layer router, for example. In this example, an application may not have information identifying the instance of another application with which it is communicating, as the external entity may manage these details on behalf of the applications. To facilitate communication between one or more applications, an application-layer router is configured to determine routing information for one or more instances of the one or more applications.

Communicating via an external entity may introduce inter-application communication latency and reduce performance of a system. For example, even if the first and second applications discussed above are executing on the same hardware element, performing inter-application communication via an external entity may require several different messages to complete a single round-trip communication (e.g., request and response/acknowledgement). In this example, the communication from the first application to the second application may require four different messages: first application→external entity→second application→external entity→first application.

Distributing routing decisions to one or more applications within the application tier may decrease the number of messages required to complete inter-application communications. For example, in the embodiment described below with reference to FIG. 2, applications communicate in a peer-to-peer fashion with assistance from a central router (e.g., an external entity). Each time an application initiates communication with another application, it requests a route to the other application from the central router, for example. In this example, however, the application receives a route from the central router and communicates in a peer-to-peer fashion with the other application using the received route. Generally speaking, peer-to-peer inter-application communication refers to inter-application communication in which intervention by a centralized router or other centralized entity is not required. It is noted, however, that applications communicating in a peer-to-peer fashion may delegate their communications to other processes such as the sidecar processes discussed below. That is, inter-application communications may be peer-to-peer communications even if the applications use proxies, sidecars, or other types of helper applications to facilitate the communications.

As used herein, the term "route" or "routing information" refers to information that a first application needs to communicate in a peer-to-peer fashion to a first instance of a second application, where the first and second applications are executing within a plurality of computing nodes. In various embodiments, the first application needs to communicate in a peer-to-peer fashion with one or more instances of a plurality of applications and, therefore, will use a plurality of different "routes" for this type of communication. For example, an IP address and/or a port number that uniquely identifies the first instance of the second application may be used as routing information.

Figure 2:
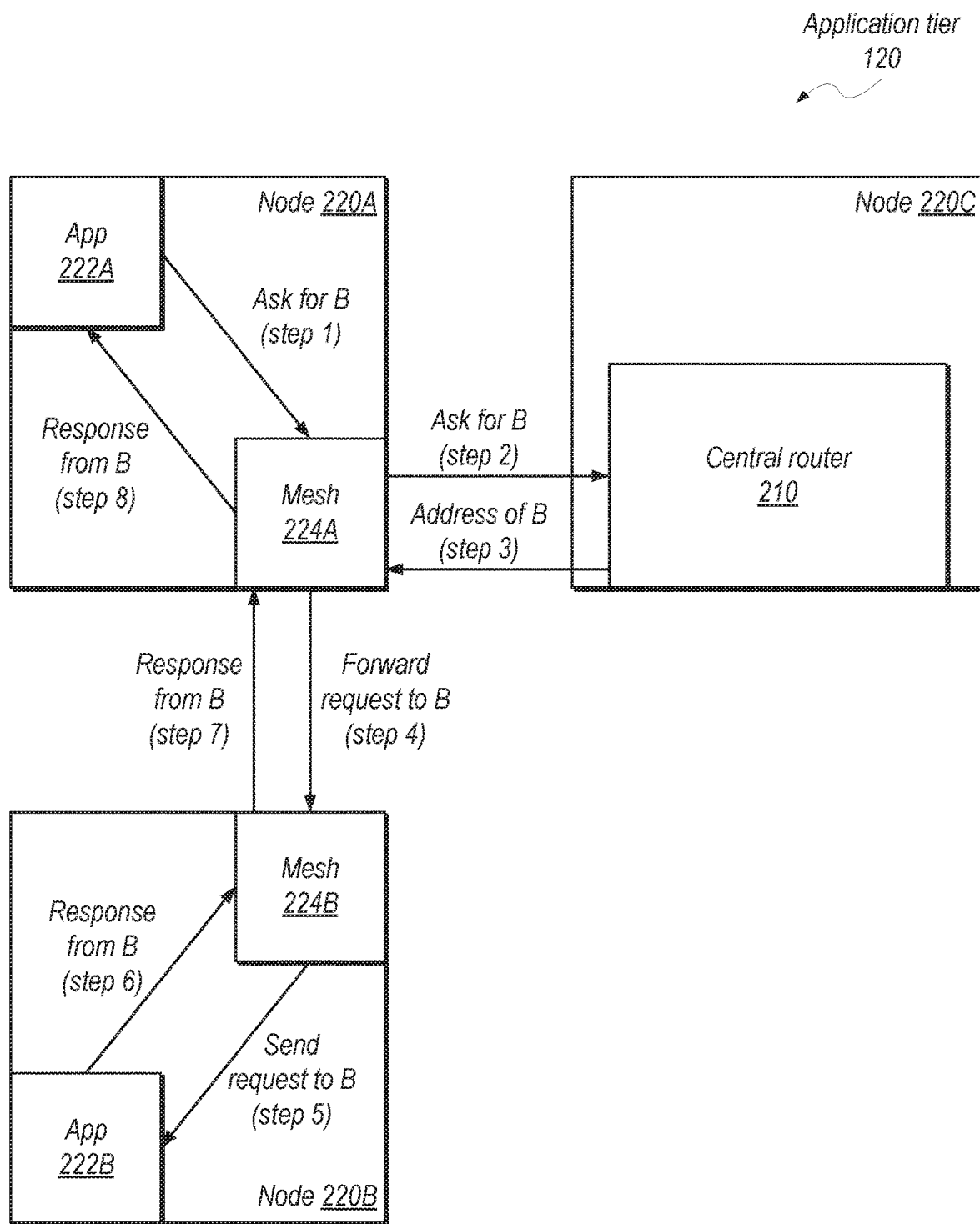
FIG. 2 is a block diagram illustrating an example of inter-application communication in a peer-to-peer fashion via a central router, according to some embodiments.

FIG. 2 is a block diagram illustrating a detailed example of a system configured to perform peer-to-peer inter-application communication via a central router, according to some embodiments. The illustrated system may, for example, be deployed for communication with and between applications 122 of application tier 120, discussed above, or within other suitable system architectures.

In the illustrated embodiment, central router 210 included in computing node 220C is configured to communicate with computing nodes 220A and 220B via one or more instances of mesh 224 (instances 224A and 224B). Mesh 224, via its collective instances, is configured to facilitate peer-to-peer inter-application communication. In the illustrated embodiment, the one or more instances of mesh 224 are configured to communicate with one or more instances of application(s) 222 included in computing nodes 220. Note that the various instances of applications 222 included in computing nodes 220, in the illustrated system, may be instances of the same application or may be instances of different applications. Additionally, note that central router 210 (as well as various other external entities) may be configured to facilitate inter-application communication for any number of applications implemented by any number of computing nodes.

As used herein, the term "computing node" refers to one or more hardware elements that may be standalone systems, one or more blade servers in a computing rack, one or more tower servers, etc. In disclosed techniques, implementation of one or more components in an inter-application communication system may be performed by a plurality of different computing nodes (e.g., not every computing node needs to implement every component of the system). For example, in disclosed techniques, some components of the system may be distributed across multiple computing nodes.

Computing node 220A, in the illustrated embodiment, includes application instance 222A and a mesh instance 224A. In the illustrated embodiment, application instance 222A sends a request to mesh instance 224A for routing information for some instance of a second application from the central router 210. Mesh instance 224A then forwards the request to central router 210. Central router 210 then resolves the generic request for an instance of the second application to a particular application instance 222B, for example by performing load balancing or other performance analysis to select application instance 222B executing on computing node 220B from among a number of instances of the second application. Central router 210 then sends the route for application instance 222B to computing node 220A (received at mesh instance 224A and ultimately forwarded to application instance 222A).

Once application instance 222A has obtained a route to application instance 222B, further communication between these instances may occur in a peer-to-peer fashion without further involvement of central router 210. For example, using the route received from central router 210, application instance 222A sends a request to mesh instance 224A, which in turn forwards the request to mesh instance 224B. Upon receiving the request, mesh instance 224B forwards it to application instance 222B. In the illustrated embodiment, application instance 222B may send a response to mesh instance 224B, which may then forward the response to application instance 222A via mesh instance 224A.

It is noted that to facilitate exposition, the inter-application communications shown in FIG. 2 as well as the other embodiments discussed herein are deliberately simplified. In many instances, a single user request (e.g., as received via presentation tier 110 of FIG. 1) may precipitate hundreds or thousands of calls between many different application instances. Thus, the illustrated patterns or topologies of inter-application communication are merely non-limiting examples; in deployment, the techniques discussed herein may be readily scaled to far more complex topologies than shown here.

It is noted that in FIG. 2 as well as other embodiments discussed below, mesh instances 224 for inter-node communication (which may also be referred to as "mesh routing instances") are implemented as distinct entities from the application instances 222 that communicate via the mesh. For example, mesh instance 224A may be implemented as a sidecar application within an application container (e.g., an execution environment) that is common to corresponding application instance 222A. In some embodiments, there may be a one-to-one correspondence between mesh instances 224 and application instances 222 on a particular computing node 220 (e.g., mesh instance 224A may correspond to application instance 222A, mesh instance 224B to application instance 222B, and so forth), while in other embodiments multiple application instances 222 may be configured to communicate via a single mesh instance 224.

Generally speaking, implementing mesh instances 224 as distinct entities from application instances 222 may enable mesh instances 224 to be developed and updated independently from application instances 222, which may simplify the management and/or improve the robustness of the system. For example, such a modular design may enable communication and/or security protocols used by mesh instances 224A to be changed in a manner that is effectively transparent to application instance 222A. It is noted, however, that alternative configurations are possible. For example, the peer-to-peer communication functionality implemented by mesh instances 224 could be incorporated directly into application instances 222.

Figure 3:
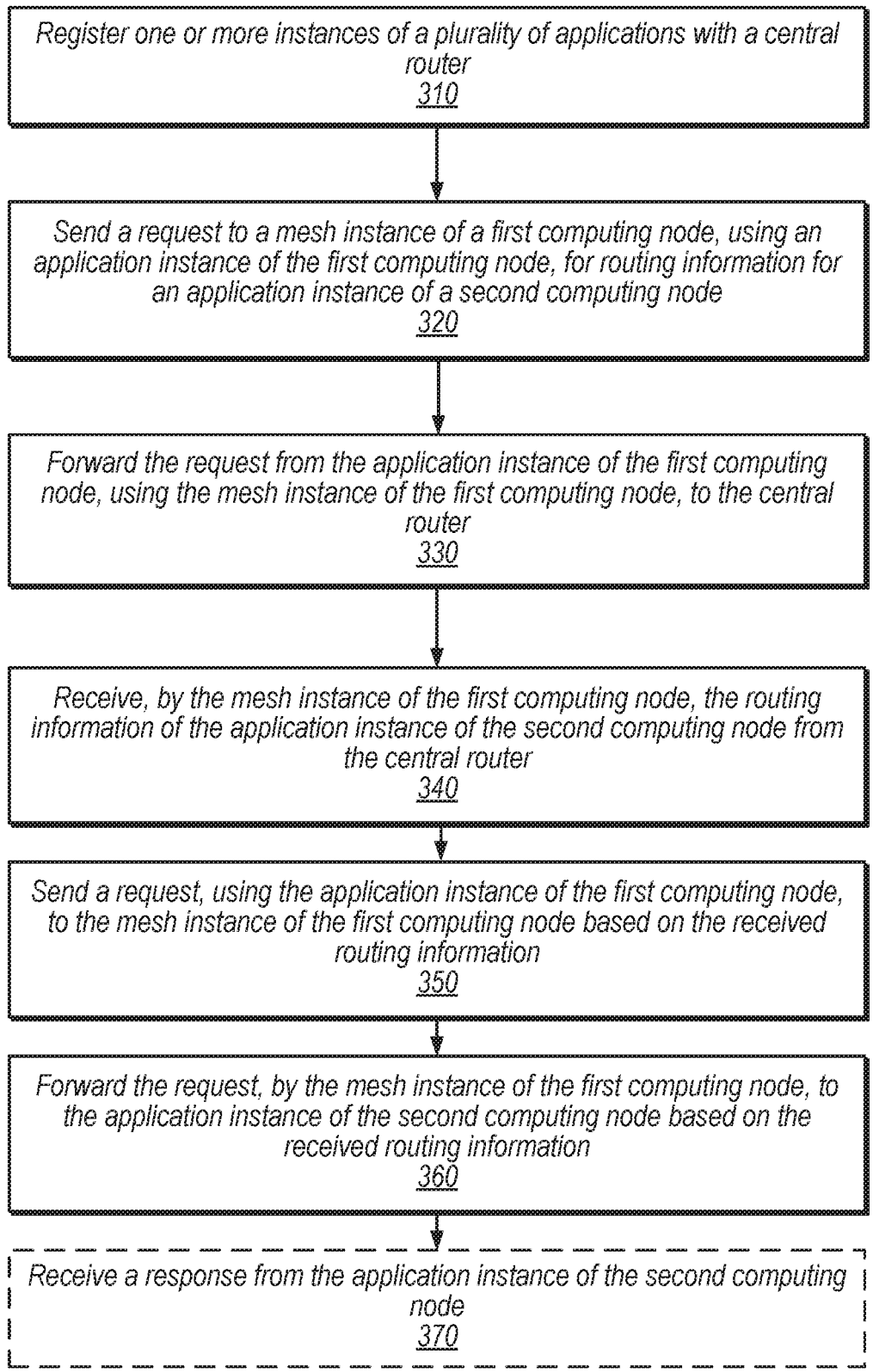
FIG. 3 is a flow diagram illustrating a method for implementing inter-application communication in a peer-to-peer fashion with assistance from a central router, according to some embodiments.

FIG. 3 is a flow diagram illustrating a method for implementing peer-to-peer inter-application communication with assistance from a central router, according to some embodiments. The method shown in FIG. 3 is described with respect to features also shown in FIG. 2, but may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 310, in the illustrated embodiment, a central router (e.g., central router 210) registers one or more instances of a plurality of applications (e.g., application instances 222). In some embodiments, registering an instance of an application provides the central router with the routing information of that instance, along with any other relevant information (e.g., the capacity of the instance to handle requests). Generally speaking, registration of an instance may enable the central router to route requests to that instance.

At 320, an application instance of a first computing node sends a request to a mesh instance of the first computing node for routing information for an application instance of a second computing node. For example, as discussed above, application instance 222A may request routing information via mesh instance 224A.

At 330, the mesh instance of the first computing node forwards the request from the application instance of the first computing node to the central router.

At 340, the mesh instance of the first computing node receives the routing information for the application instance of the second computing node from the central router. For example, as noted above, central router 210 may select application instance 222B from among a number of instances based on a load balancing or other suitable algorithm.

At 350, the application instance of the first computing node sends a request to the mesh instance of the first computing node based on the received routing information.

At 360, the mesh instance of the first computing node forwards the request via the mesh instance of the second computing node to the application instance of the second computing node based on the routing information received from the central router.

At 370, the application instance of the first computing node receives a response from the application instance of the second computing node (e.g., the mesh instance of the second computing node forwards the response from the application instance of the second computing node to the mesh instance of the first computing node, which then forwards the response to the application instance of the first computing node). For example, in some embodiments, requests made to an application instance may trigger a response sent back to the requesting application instance, such as result data, an acknowledgement of the request, or any other suitable type of response. Note that element 370 is optional, as the application instance of the second computing node may not send a response.

In the embodiment of FIG. 2 as well as any of the embodiments discussed below, health checking (which may also be referred to as status checking) may be performed in order to monitor the state of application instances within the system. For example, health checking may be performed periodically by an external entity facilitating inter-application communication. Health checking, in some embodiments, allows an external entity (e.g., a central router, central registry, etc.) to monitor the status of application instances, in order to account for current application status when making routing decisions. If, during a periodic health check by the external entity, a given instance of an application is determined to be unhealthy, the external entity may incorporate this information into its routing decisions, for example by not selecting that instance to handle requests from applications until its status changes. Examples of factors that may be taken into account in determining whether an application instance is unhealthy may include whether it is unresponsive, the latency/response time of the instance to requests, a measure of the current workload of the instance, or other factors, including factors that may be self-reported by the instance.

In some embodiments, the status of an instance may be tracked as a binary state (e.g., the instance is either online or offline) while in other embodiments, the status may be tracked as a value or score within a defined range. In the latter approach, routing decisions may be made on the basis of threshold values (e.g., in which an instance is considered available for routing requests if its health is above a certain value). Different threshold values may be employed for different applications or types of requests. In some embodiments, the external entity may only receive status information for use internally, whereas in other embodiments, status information may be distributed by the external entity back to application instances. That is, in some embodiments, the flow of health checking may be bidirectional between an application instance and an external entity.

As discussed above, health checking may be performed periodically (e.g., after the passage of a defined period of time since an instance was last checked). In some embodiments, an external entity may be configured to perform health checks based on detected operational events, such as forwarding failures. For example, if a mesh instance experiences a failure when trying to forward a request from an application instance on a first computing node to an application instance on a second computing node, the mesh instance may report this failure back to the external entity. In this example, the report may trigger the external entity to perform a health check to see if it can repeat the failure. If the external entity can repeat the failure, it may consider the application instance unhealthy and take appropriate action (e.g., by not routing requests to this instance). If, however, the external entity cannot repeat the failure, it may consider the application instance healthy until the next periodic health check. In this case, the failure may be transient in nature and/or only observable by the mesh instance attempting to forward the request. In some embodiments, the external entity may track the history of unrepeatable failures, since these may indirectly indicate a reliability problem with a particular instance. For example, if an instance exhibits a threshold number of reported failures over a period of time, the external entity may conclude that the instance is unhealthy even if the failures cannot be repeated, and may adjust routing behavior accordingly.

Note that in distributed routing embodiments, additional health checking steps may be implemented by application instances or other instances executing on the computing nodes themselves instead of or in addition to periodic health checks being performed by the external entity. For example, the routing discussed with respect to any of the embodiments disclosed herein may involve application instances reporting their own health checks to a central entity such as a central registry, and/or sending requests for health checks to the central registry, in some embodiments along with requests for updated routing information.

Central Registry System for Inter-Application Communication

The central router configuration discussed above with reference to FIGS. 2 and 3, may improve inter-application communication performance relative to configurations in which all inter-application communication is mediated by an external entity or router, in that once routing information is obtained from the central router, further inter-application communication may occur in a peer-to-peer manner. In this configuration, however, a request typically needs to be made to the central router each time one application requests to communicate with another, which may contribute latency to the communication process. Additionally, to the extent that the central router needs to be involved in each request, it may represent a single point of failure (e.g., a failure of the central router might affect all inter-application communication).

In another embodiment, a central registry may distribute routing information to computing nodes, allowing for application instances, implemented by the computing nodes, to send one or more requests to application instances without needing to externally obtain routing information for each request. In such an embodiment, routing decisions are moved to the computing nodes rather than being performed by a central router. For example, the routing decisions may be implemented within application instances themselves, within mesh routing instances associated with application instances, or within a different entity local to a computing node.

Figure 4:
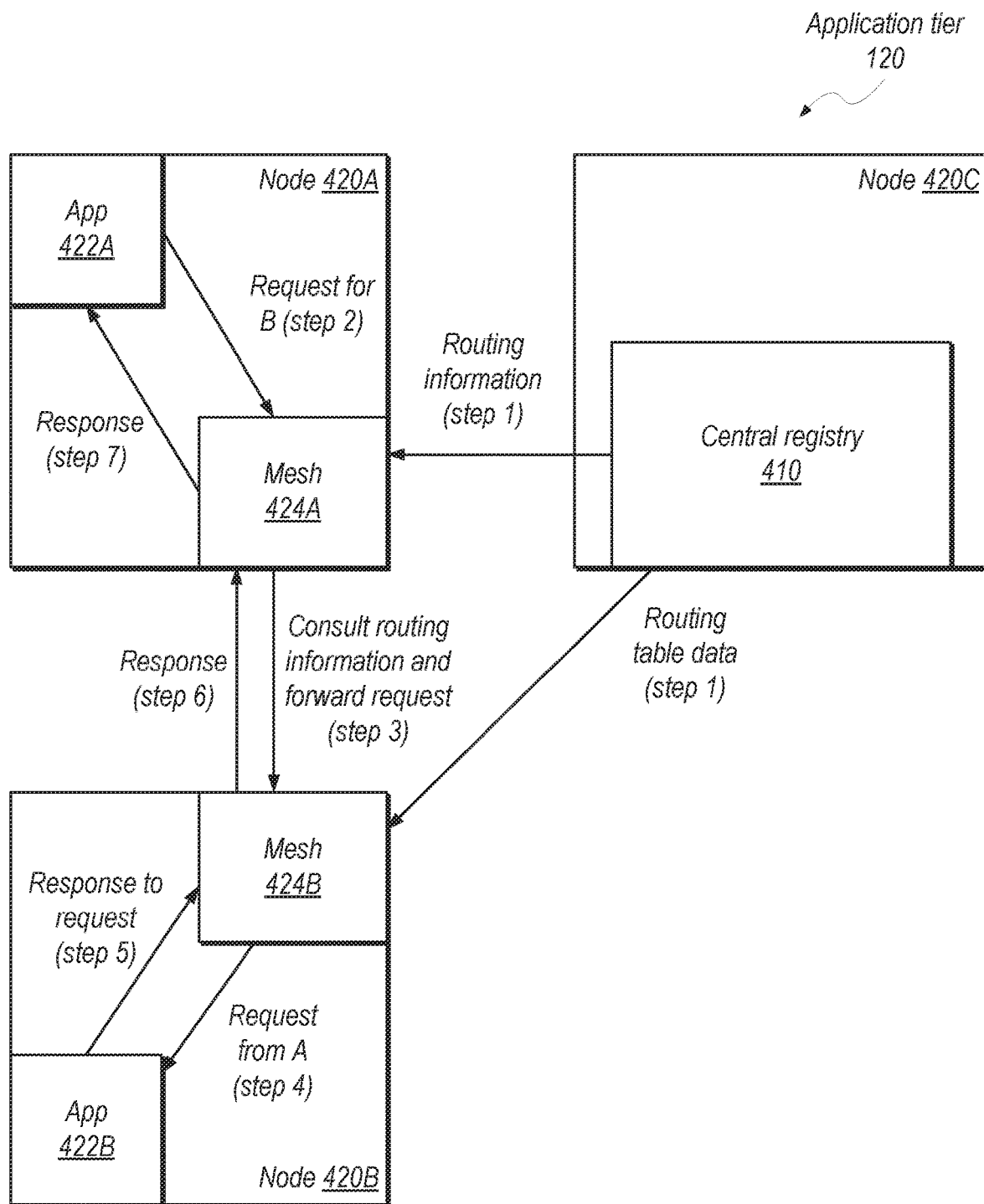
FIG. 4 is a block diagram illustrating an example of peer-to-peer inter-application communication via a central registry, according to some embodiments.

FIG. 4 is a block diagram illustrating an example of peer-to-peer inter-application communication via a central registry, according to some embodiments. Similar to FIG. 2 discussed above, the illustrated system may be deployed for communication with and between applications 122 of application tier 120, discussed above with reference to FIG. 1, or within other suitable system architectures.

In the illustrated embodiment, central registry 410, implemented by computing node 420C, is configured to communicate with mesh instances 424A and 424B (implemented by computing nodes 420A and 420B). Mesh instances 424A and 424B in turn are configured to communicate with application instances 422A and 422B, respectively. Note that computing nodes 420, mesh 424, and application instances 422 may be configured similarly to computing nodes 220, mesh 224, and application instances 222 discussed above with respect to FIGS. 2 and 3.

In the illustrated embodiment, central registry 410 sends routing information to mesh instances 424A and 424B. In some embodiments, central registry 410 may distribute a copy of all available routing information (e.g., routing information for all known application instances 422 deployed within the system) so that each of mesh instances 424 has a local copy of the routing information. Central registry 410 may also distribute updates to one or more routes previously included in routing information sent to mesh instances 424. For example, central registry 410 may determine, based on the health checking discussed above, that certain application instances 422 have become available or unavailable for routing requests, and may distribute updated routing information reflecting these changes. In some embodiments, mesh instances 424 store the received routing information internally for future reference when sending one or more requests from application instances 422. In other embodiments, the routing information may be stored by application instances 422 or by another service local to each of nodes 420.

Mesh instance 424A, in the illustrated embodiment, receives a request from application instance 422A. Based on receiving the request from application instance 422A, mesh instance 424A consults its internal routing information (received from the central registry) and, based on that information, forwards the request to mesh instance 424B. Mesh instance 424B sends the request from application instance 422A to application instance 422B. Once it has received the request, application instance 422B may send a response to mesh instance 424B, which then forwards the response to mesh instance 424A. Mesh instance 424A then sends the response from application instance 422B to application instance 422A.

Note that similar processes may be implemented for one or more requests from application instance 422B or any of various application instances based on corresponding mesh instances 424 receiving routing information data from central registry 410.

Figure 5:
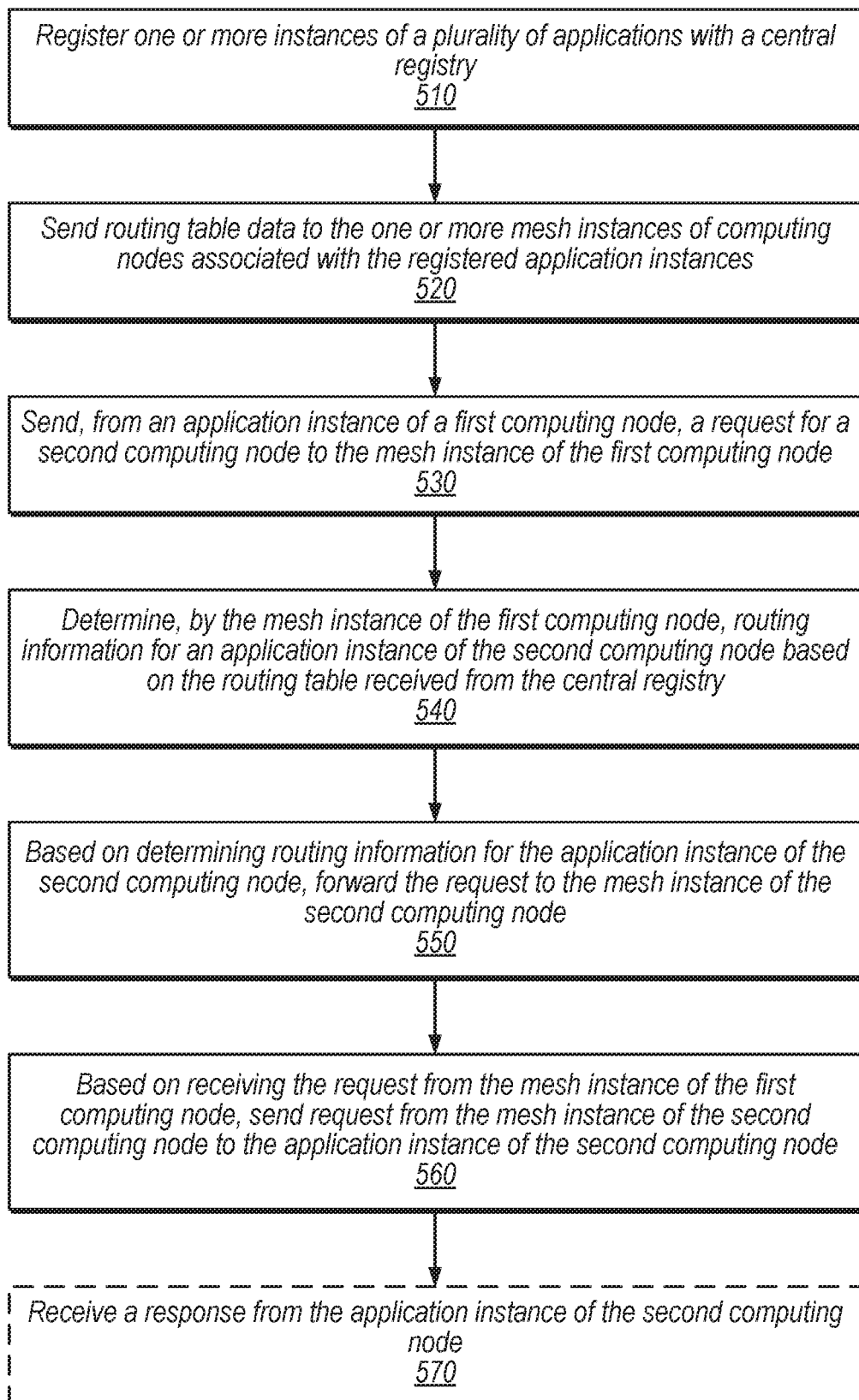
FIG. 5 is a flow diagram illustrating a method for implementing inter-application communication in a peer-to-peer fashion with assistance from a central registry, according to some embodiments.

FIG. 5 is a flow diagram illustrating a method for implementing inter-application communication in a peer-to-peer fashion with assistance from a central registry, according to some embodiments. The method shown in FIG. 5 is described with respect to features also shown in FIG. 4, but may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a central registry (e.g., central registry 410) registers one or more instances of a plurality of applications (e.g., application instances 422).

At 520, the central registry sends routing information to one or more mesh instances of computing nodes associated with the registered application instances (e.g., mesh instances 424 of nodes 420). Generally speaking, the central registry may attempt to ensure that each copy of the routing information within the system is consistent, for example by distributing updates as noted above. In some embodiments, the central registry may simply broadcast updates to all instances that maintain copies of routing information. In other embodiments, the central registry and the mesh instances may implement a suitable coherence or synchronization protocol so that updates may be performed on a more granular level. In some embodiments, sending routing information to the mesh instances may advantageously improve network latency and reliability.

At 530, an application instance of a first computing node sends a request for a second computing node to the mesh instance of the first computing node.

At 540, the mesh instance of the first computing node determines a route for an application instance of the second computing node based on the local routing information received from the central registry. In some cases, the mesh instance of the first computing node may arbitrarily select an application instance from the routing table (e.g., the mesh instance may not perform load balancing algorithms in the same manner as the central router described previously).

At 550, the mesh instance of the first computing node forwards the request to the mesh instance of the second computing node based on determining routing information for the application instance of the second computing node.

At 560, the mesh instance of the second computing node sends the request to the application instance of the second computing node based on receiving the request from the mesh instance of the first computing node.

At 570, the first computing node (via its mesh instance) receives a response from the application instance of the second computing node. Such a response may be similar to that discussed above with respect to element 370 of FIG. 3. Note that like element 370, element 570 is optional, as the application instance of the second computing node may not send a response to the request.

In the central registry configuration just described, by distributing a complete set of routing information throughout the system, it may be possible for inter-application communication to be conducted in an entirely peer-to-peer fashion (e.g., there may be no need for an initial request for routing information from a centralized entity such as the central router discussed above). This may in turn reduce communication latency, and may also improve overall system reliability; because multiple copies of routing information exist within the system, failure of a single copy may have fewer implications. On the other hand, distributing and maintaining multiple complete copies of system-wide routing information may become computationally expensive as the number of instances scales. Additionally, unless current application load information (i.e., information indicating the relative utilization of various application instances) is also distributed along with routing information, it may be difficult to make routing decisions based on load balancing principles.

Central Registry System with Sparse Routing Information

The central registry configuration just discussed may improve inter-application communication performance relative to the central router configuration discussed above with reference to FIGS. 2 and 3, in that information may not initially need to be obtained from the central registry for peer-to-peer inter-application communication to occur. As discussed above, however, maintaining the multiple complete copies of the system-wide routing information and performing load balancing may be computationally expensive.

In another embodiment, instead of distributing multiple complete copies of routing information throughout the system, a central registry distributes sparse routing information to computing nodes (e.g., routing information needed only for communication with a subset of application instances). In this embodiment, the central registry distributes and maintains multiple partial copies of the system-wide routing information (e.g., mesh instance may receive routing information for one application instance, rather than all application instances that exist within the system). Reducing the size of distributed routing information may advantageously reduce the computational expense associated with storing and updating routing information. For example, instead of maintaining a complete copy of routing information on a particular computing node, only the routing information actually being used by application instances on the particular computing node may be locally stored.

Figure 6:
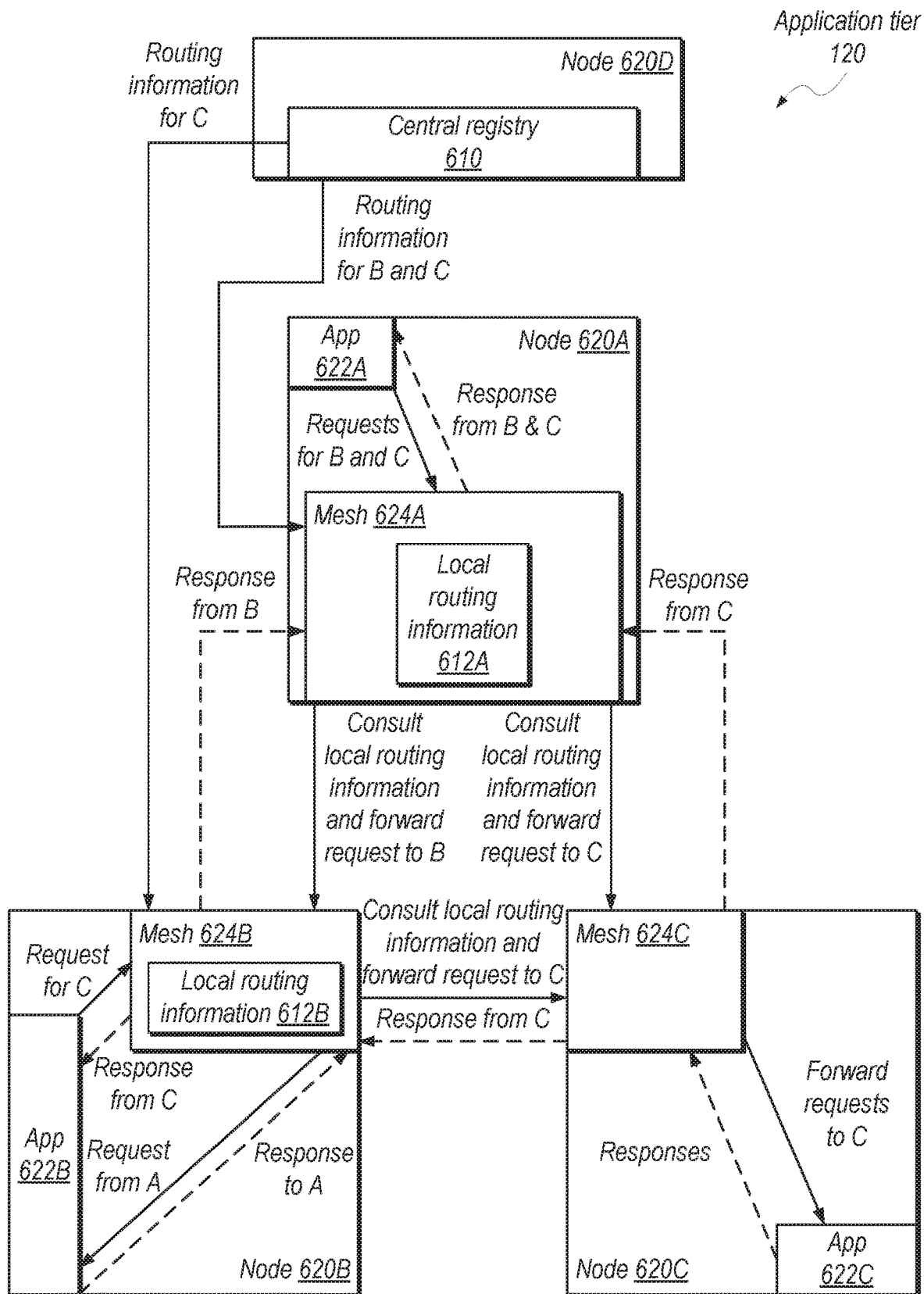
FIG. 6 is a block diagram illustrating an example of peer-to-peer inter-application communication via a central registry system with sparse routing information, according to some embodiments.

FIG. 6 is a block diagram illustrating an example of peer-to-peer inter-application communication via a central registry system with sparse routing information, according to some embodiments. As discussed above, the illustrated system may be deployed for communication with and between applications 122 of application tier 120, discussed above with reference to FIG. 1, or within other suitable system architectures.

In the illustrated embodiment, central registry 610, implemented by computing node 620D, is configured to communicate with mesh instances 624A, 624B, and 624C (although central registry 610 is not shown communicating with mesh instance 624C). Central registry 610 may also be configured to communicate with various other mesh instances. Mesh instances 624 in turn are configured to communicate with application instances 622 implemented on corresponding computing nodes 620. Note that computing nodes 620, mesh instances 624, and application instances 622 may behave similarly to similar elements discussed above with respect to FIGS. 4 and 5.

In the illustrated embodiment, mesh instances 624 may maintain local routing information 612 on behalf of application instances 622 on respective computing nodes 620. When an application instance 622 requests to perform inter-application communication, its corresponding mesh instance 624 may check local routing information 612 to determine whether it already contains the needed routing information. If so, peer-to-peer inter-application communication may be performed using the existing routing information. If not, mesh instance 624 may request routing information from central registry 610 and store it within local routing information 612 for future use.

More particularly, in the illustrated example, local routing information 612A includes routing information for application instances 622B and 622C, and local routing information 612B includes routing information for application instance 622A, based on prior requests. Mesh instance 624A stores the routing information for application instances 622B and 622C locally for future reference. Based on receiving requests from application instance 622A, mesh instance 624A consults its locally stored routing information. After consulting the local routing information 612A, mesh instance 624A forwards a request to application instance 622B and a request to application instance 622C.

Mesh instance 624B sends the request from application instance 622A to application instance 622B, which may in turn send a response back to mesh instance 624B who may send the response on to mesh instance 624A. In some embodiments, application instance 622B does not send a response to the request from application instance 622A.

In addition to routing requests from other application instances, mesh instance 624B receives routing information for application instance 622C from central registry 610 and stores the information locally. Based on receiving a request from application instance 622B, mesh instance 624B consults local routing information 612B and forwards the request to application instance 622C.

Mesh instance 624C may receive the requests from application instance 622A and 622B at different times. Mesh 624C forwards the requests from application instance 622A and 622B to application instance 622C, who may respond to one or both of the requests. In embodiments where application instance 622C sends a response to both of the requests, mesh instance 624C forwards the responses to mesh instance 624A and 624B, where they may be sent to application instances 622A and 622B. Note that mesh instance 624C may receive routing information for one or more application instances from central registry 610 and store the information locally.

Note that similar processes may be implemented to send sparse routing information to a plurality of mesh instances requesting routing information in addition to mesh instances 624A and 624B. Moreover, it is noted that in some embodiments, a one-to-one correspondence may exist between mesh instances 624 and application instances 622 (e.g., in a sidecar configuration), while in other embodiments, one mesh instance 624 may service a number of application instances 622. The configuration of local routing information 612 may correspondingly vary with the configuration of mesh instances 624. In some embodiments, local routing information 612 may be implemented elsewhere within a particular computing node 620, including within application instances 622 themselves.

Figure 7A:
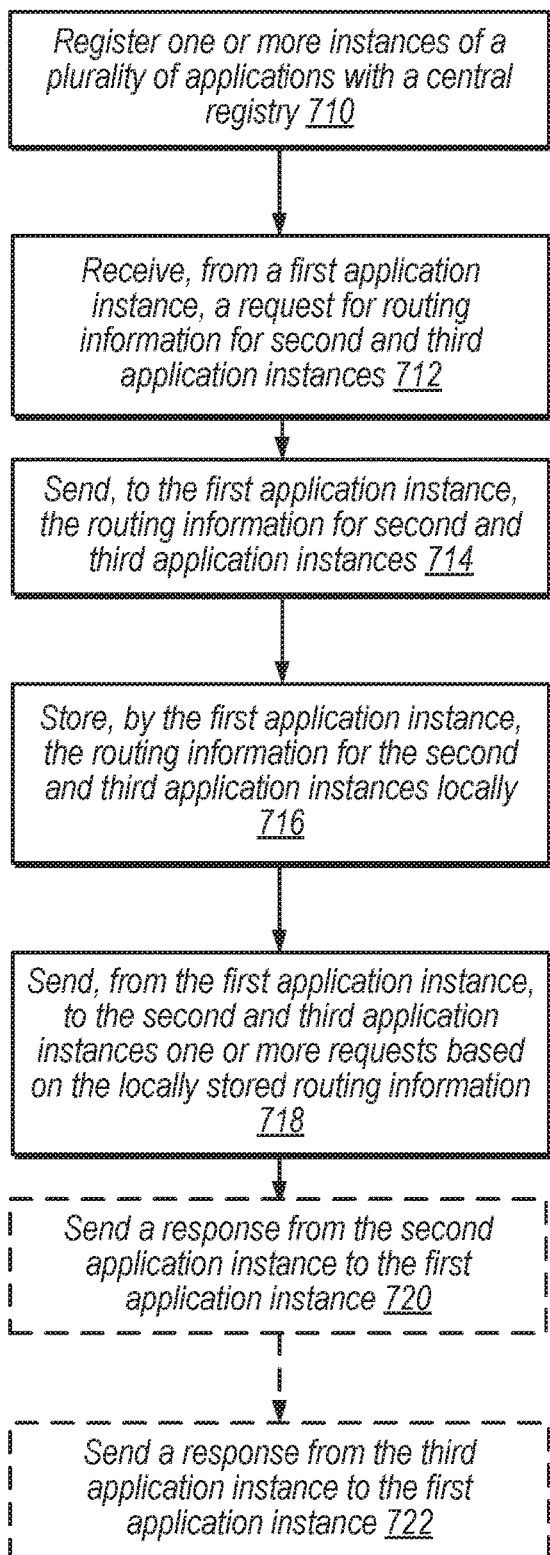
FIGS. 7A and 7B are flow diagrams illustrating several related methods for implementing inter-application communication in a peer-to-peer fashion using a central registry that distributes sparse routing information, according to some embodiments.
Figure 7B:
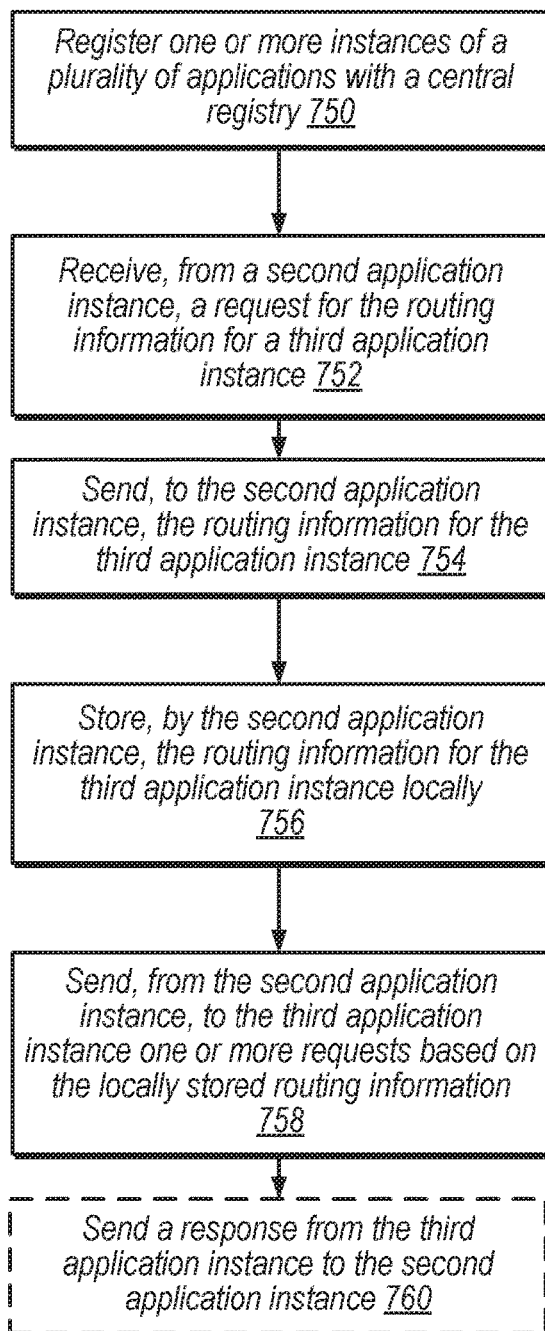

FIGS. 7A-B are flow diagrams illustrating several similar methods for implementing inter-application communication in a peer-to-peer fashion using a central registry that distributes sparse routing information for two application instances, according to some embodiments. In some embodiments, the methods may be performed concurrently as examples of different types of communication within a system. The methods shown in FIGS. 7A-B are described with respect to features also shown in FIG. 6, but may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a central registry (e.g., central registry 610) registers one or more instances of a plurality of applications (e.g., application instances 622A-622C).

At 712 the central registry receives a request for routing information for second and third application instances from a first application instance.

At 714 the central registry sends the routing information for second and third application instances to the first application instance.

At 716 the first application instance stores the routing information for the second and third application instances locally based on receiving the routing information from the central registry.

At 718 the first application instance sends one or more requests to the second and third application instances based on the locally stored routing information for the second and third application instances.

At 720 the second application instance sends a response to the first application instance based on receiving one or more requests.

At 722 the third application instance sends a response to the first application instance based on receiving one or more requests. Note that elements 720 and 722 are optional as one or both of the second and third application instances may not send a response to the one or more requests from the first application instance.

Turning to FIG. 7B, at 750, a central registry (e.g., registry 610) registers one or more instances of a plurality of applications (e.g., application instances 622).

At 752 the central registry receives, from a second application instance, a request for routing information for a third application instance.

At 754 the central registry sends the routing information for the third application instance to the second application instance.

At 756 the second application instance stores the routing information for the third application instance locally.

At 758 the second application instance sends one or more requests to the third application instance based on the locally stored routing information for the third application instance.

At 760 the third application instance sends a response to the second application instance based on receiving one or more requests from the second application instance. Note that element 760, similar to elements 720 and 722 discussed above with reference to FIG. 7A, is optional as the third application instance may not send a response to the one or more requests from the second application instance.

Lease-Based Central Registry System for Inter-Application Communication

The central registry embodiment discussed above with reference to FIGS. 6 and 7 may decrease the computational expense associated with maintaining multiple copies of routing information for the entire network. In the embodiment discussed above, however, it may be difficult to efficiently distribute load across the network unless current state information is also distributed along with routing information, or is otherwise accounted for.

In another embodiment, a central registry distributes lease-based routing information for application instances based on application demand. Generally speaking, a lease refers to a resource allocation that is bounded in time. In the lease-based routing embodiment, a mesh instance may send a lease request on behalf of an application instance to a central registry, based on expected resource allocation by the application instance. The central registry may then grant the request, in whole or in part, based on its assessment of application instance availability and the requested resource allocation.

For example, the mesh instance may present lease requests for a fixed size of resource capacity periodically (e.g., 1000 requests, then 1000 requests, etc. every few seconds). In another example, based on expected utilization, the mesh instance may present lease requests for resource capacity in exponentially increasing sizes (e.g., 1000 requests, then 2000 requests, then 4000 requests, etc.) in order to reduce the overall number of leases needed to meet its expected utilization. It is possible, however, that the central registry may grant less than the requested resource allocation, or may split a request into multiple different leases, depending on resource availability. In some embodiments, a mesh instance may renew one or more previously granted leases by sending a new lease request to the central registry; doing so before a current lease expires may prevent interruptions in communication.

By sending lease-based routing information that is valid only for an amount of time and for a given amount of resources, the granularity of the connectivity demand for routing information may be reduced relative to other embodiments. Load balancing may be performed in determining whether and to what degree to grant a lease, but may additionally be performed by the mesh instance in some cases. For example, a mesh instance may have multiple leases for one or more application instances with connectivity capacity (e.g., the leases have not expired) and may perform one or more load balancing algorithms to identify which lease to use for a given request.

Figure 8:
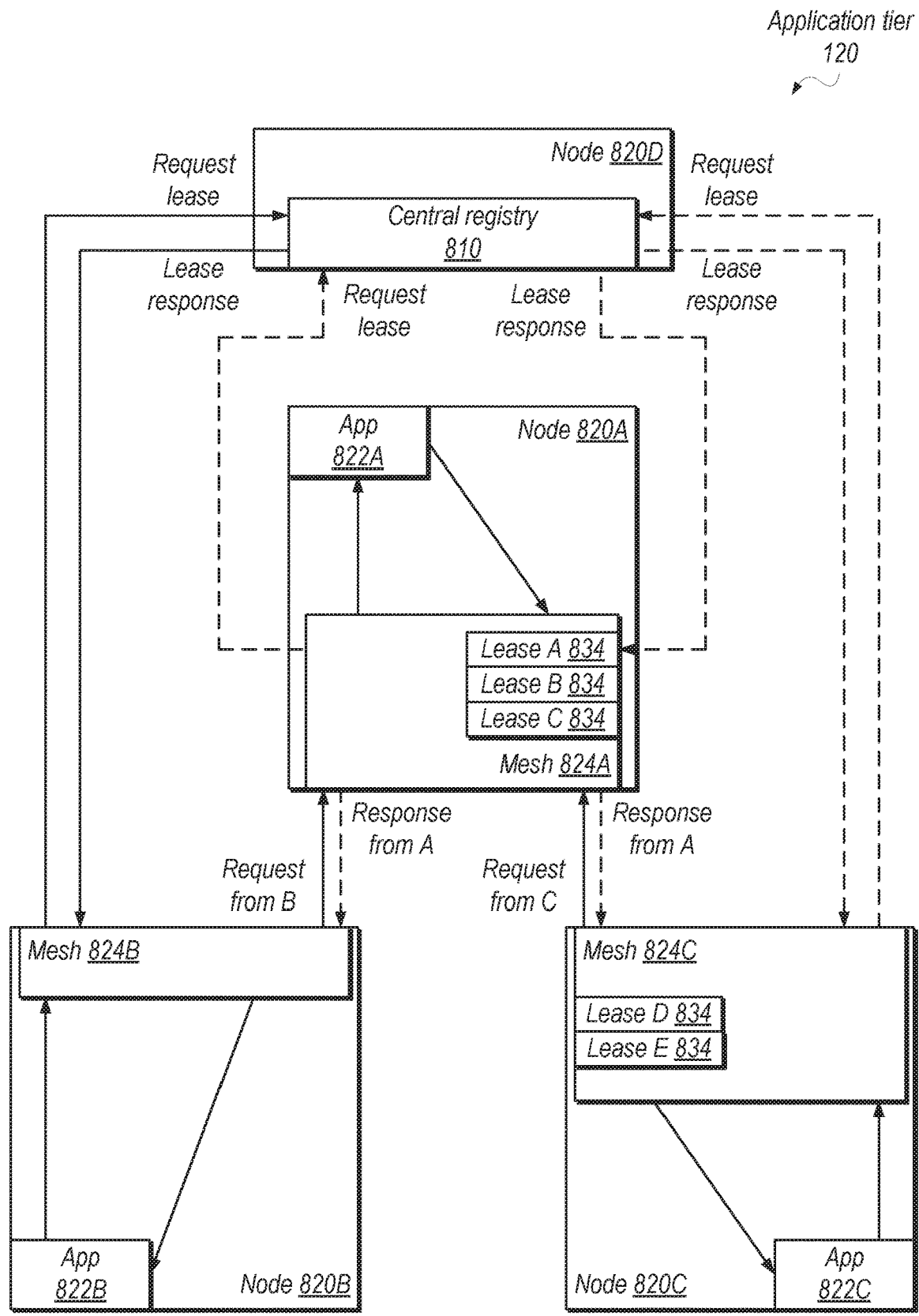
FIG. 8 is a block diagram illustrating an example of peer-to-peer inter-application communication via a lease-based central registry, according to some embodiments.

FIG. 8 is a block diagram illustrating an example of peer-to-peer inter-application communication via a lease-based central registry, according to some embodiments. In the illustrated embodiment, computing node 820D is configured to implement lease-based central registry 810 to send leases 834 to one or more mesh instances 824 (e.g., mesh instance 824B). Computing nodes 820A, 820B, and 820C are configured to implement mesh instance 824A, 824B, and 824C to communicate with application instances 822 (which may correspond to one or more of applications 122 of application tier 120, discussed above with reference to FIG. 1) to handle network traffic, for example. Note that the computing nodes, mesh instances, and application instances shown in FIG. 8 may behave similarly to various similar elements discussed above with reference to FIGS. 2, 4, and 6.

Mesh instance 824B, in the illustrated embodiment, does not currently have any leases 834 stored internally and, therefore, sends a lease request to the central registry 810 on behalf of application instance 822B. Based on receiving the lease request from mesh instance 824B, central registry 810 sends a lease response (that may include multiple leases) to mesh instance 824B. Based on routing information included in the lease response, mesh instance 824B sends a request to mesh instance 824A to implement peer-to-peer inter-application communication on behalf of application instance 822B. If applicable, mesh instance 824A may forward a response from application instance 822A to mesh instance 824B, which may in turn convey the response to application instance 822B. Note that embodiments of lease requests and responses are discussed in detail below with respect for FIGS. 9A and 9B.

Mesh instance 824C, in the illustrated embodiment, has two different leases 834 stored. In some embodiments, mesh instance 824C sends a lease request to central registry 810 after determining that the leases it currently has are expired and/or do not contain enough capacity for a given request. As a result, mesh instance 824C may send a lease request to central registry 810 and central registry 810 may, in turn send a lease response to mesh instance 824C. Based on receiving a lease with more capacity (and a request from application instance 822C), mesh instance 824C sends a request to mesh instance 824A. In some embodiments, the request is sent using multiple leases (where each lease individually does not contain enough capacity to send the request). Mesh instance 824A may send a response from application instance 822A to mesh instance 824C.

Note that mesh instance 824A may also send lease requests to central registry 810 in order to send requests to one or more application instances. In the illustrated example, however, mesh instance 824A already has three leases 834 and may not send a lease request (e.g., because it already has leases with capacity and is able to send a request to one or more application instances).

It is noted that while leases 834 have been discussed as being implemented by mesh instances 824, other configurations are possible. For example, lease information may be maintained by application instances 822 themselves, or by a different entity within nodes 820.

Figure 9A:
FIG. 9A is a block diagram illustrating an example lease request, according to some embodiments.

FIG. 9A is a block diagram illustrating an example lease request, according to some embodiments. In the illustrated embodiment, lease request 910, sent from a mesh instance (e.g., mesh instance 824B) includes various parameters that provide information to a central registry (e.g., central registry 810) receiving the lease request. The information provided in the lease request may allow the central registry to determine whether to send a lease response (as well as what kind of lease response to send).

Lease request 910, in the illustrated embodiment, specifies an application instance name 912 (e.g., the name of application instance 824B), where the application name identifies the application instance that one or more requests will be sent to. The lease request 910 also specifies a total number of expected requests 914 that indicates how many requests the application requesting the lease would like to send. A number of concurrent expected requests 916, specified in lease request 910, indicates how many requests the application requesting the lease is permitted to have outstanding at one time. Lease request 910 specifies a start time 918 for the lease and an expected duration 920 of the lease. Note that various other lease parameters may be included in lease request 910, and/or the parameters included may be different than those shown. In particular, a requested resource allocation may be formulated in terms other than a number of expected requests (e.g., in terms of bandwidth, storage, or any other suitable metric depending on the type of resource being requested).

Figure 9B:
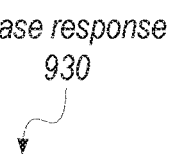
FIG. 9B is a block diagram illustrating an example lease response, according to some embodiments.

FIG. 9B is a block diagram illustrating an example lease response, according to some embodiments. In the illustrated embodiment, lease response 930, similar to lease request 910 discussed above, includes various parameters for the granted lease (e.g., sent from central registry 810 to mesh instance 824A). In some embodiments, a mesh instance receives lease response 930 from central registry 810 and sends one or more requests to an application instance based on one or more parameters included in the lease response.

In the illustrated embodiment, lease response 930 specifies an application name 912, which may be the same information included in lease request 910, and lease start time 918, which may differ from the requested start time. Lease response 930 may further include network address information 932 (e.g., an IP address and port number of an application instance corresponding to the granted lease, or another suitable encoding of routing information), a lease ID 934 that uniquely identifies the lease that is being sent to a mesh instance, and a lease end time 936 that specifies when the granted lease will expire.

Lease response 930 also includes a total number of permitted requests 938 (e.g., how may requests may be sent in the aggregate under the lease) and a number of permitted concurrent requests 940 (e.g., how many requests are allowed to be sent at one time). Finally, lease response 930 may include a lease signature 942 (e.g., central registry 810 signs the lease response) that may allow mesh instances to verify that the lease response is authentic and has not been altered and/or damaged by anyone other than the central registry sending the lease response. Examples of lease authentication (e.g., verifying lease signature 942) are discussed below. Note that multiple lease responses (and/or, in some embodiments, multiple leases per response) may be sent to a mesh instance based on receiving a single lease request. As with lease request 910, it is noted, the illustrated embodiment represents merely one example, and that other embodiments of lease response 930 including additional and/or different parameters are possible.

Example Methods of Lease-Based Inter-Application Communication

Figure 10:
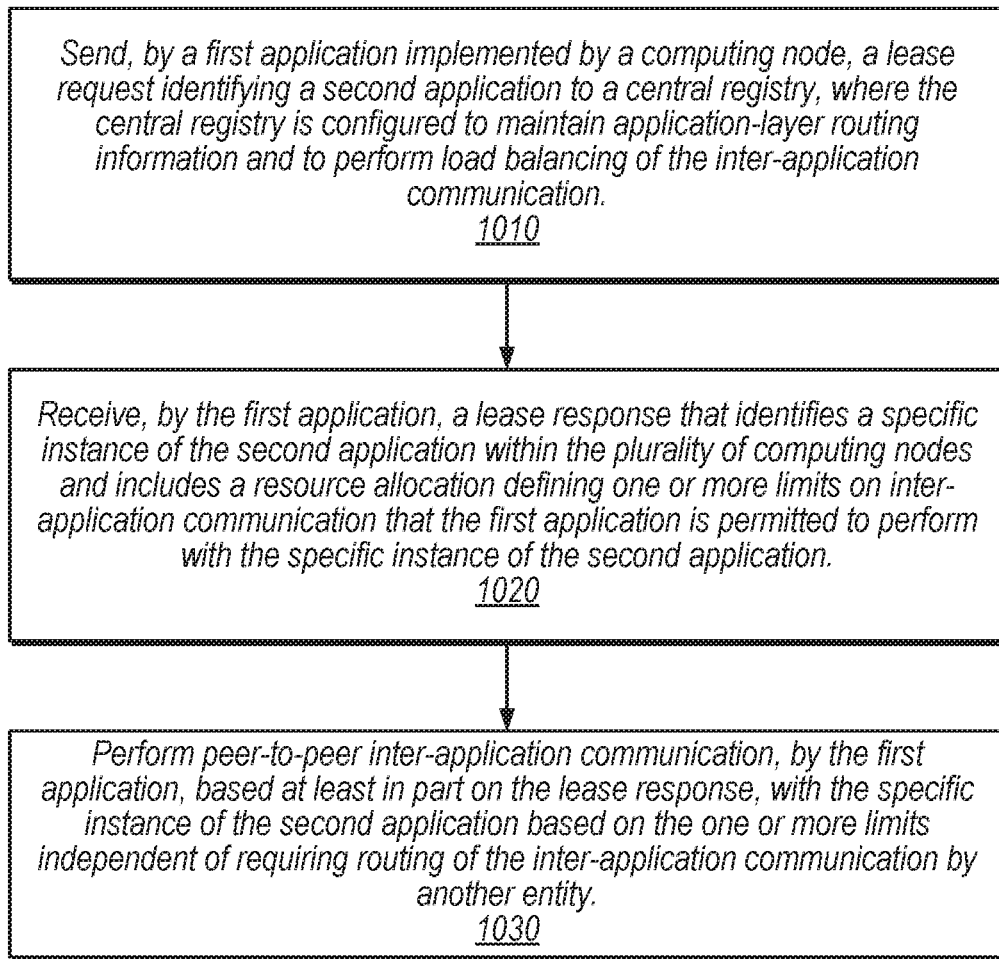
FIG. 10 is a flow diagram illustrating an example method for performing inter-application communication in a peer-to-peer fashion using a lease-based central registry, according to some embodiments.

FIG. 10 is a flow diagram illustrating an example method for performing inter-application communication in a peer-to-peer fashion using a lease-based central registry in a system that includes a number of computing nodes, according to some embodiments. The method shown in FIG. 10 is described with respect to features also shown in FIG. 8, but may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At element 1010, in the illustrated embodiment, a first application implemented by a computing node sends a lease request identifying a second application to a central registry, where the central registry is configured to maintain application-layer routing information and to perform load balancing of the inter-application communication. In some embodiments, the lease request specifies one or more of: a name of the second application, a number of total requests the first application expects to send to the second application, a number of concurrent requests the first application expects to send to the second application, a requested lease start time, an expected lease duration, or any combination thereof.

At 1020 the first application receives a lease response that identifies a specific instance of the second application within the computing nodes and includes a resource allocation defining one or more limits on inter-application communication that the first application is permitted to perform with the specific instance of the second application. In some embodiments, the lease response specifies one or more of: a name of the second application, network address information identifying the specific instance of the second application within the computing nodes, a lease identifier, a lease start time, a lease end time, a total number of requests the first application is permitted to send, a total number of concurrent requests the first application is permitted to send, a lease signature, or any combination thereof.

In some embodiments, the computing nodes may be configured to execute instructions to implement a number of mesh routing instances, and wherein to perform inter-application communication and to communicate with the central registry, a first application executing on a first computing node is configured to communicate with a first mesh routing instance executing on the first computing node. In some embodiments, the first mesh routing instance is configured as a sidecar application within an application container common to the first application. Thus, for example, there may exist a one-to-one correspondence between a mesh routing instance and an instance of an application, but by segregating mesh routing functionality within a separate instance, it may be possible to configure, deploy, and/or update mesh routing functionality in a manner that is transparent to applications.

In some embodiments, in order to communicate with the second application, the first application determines that a valid lease response previously received from the central registry exists and based on the information in the valid lease response, the first application performs inter-application communication without submitting an additional lease request to the central registry. In some embodiments, in order to determine that the valid lease response exists, the first application is further configured to determine that a previously received lease response has not expired and that the first application has not exceeded a resource allocation identified in the previously received lease response.

At 1030 the first application performs peer-to-peer inter-application communication, based at least in part on the lease response, with the specific instance of the second application based on the one or more limits independently of requiring routing of the inter-application communication by another entity. For example, once a lease has been obtained, further inter-application communication may occur in a peer-to-peer fashion for as long as the lease remains valid and as long as the resource allocation associated with the lease has not been fully utilized. This may improve inter-application communication performance, for example by reducing latency that arises from centralized routing.

Figure 11:
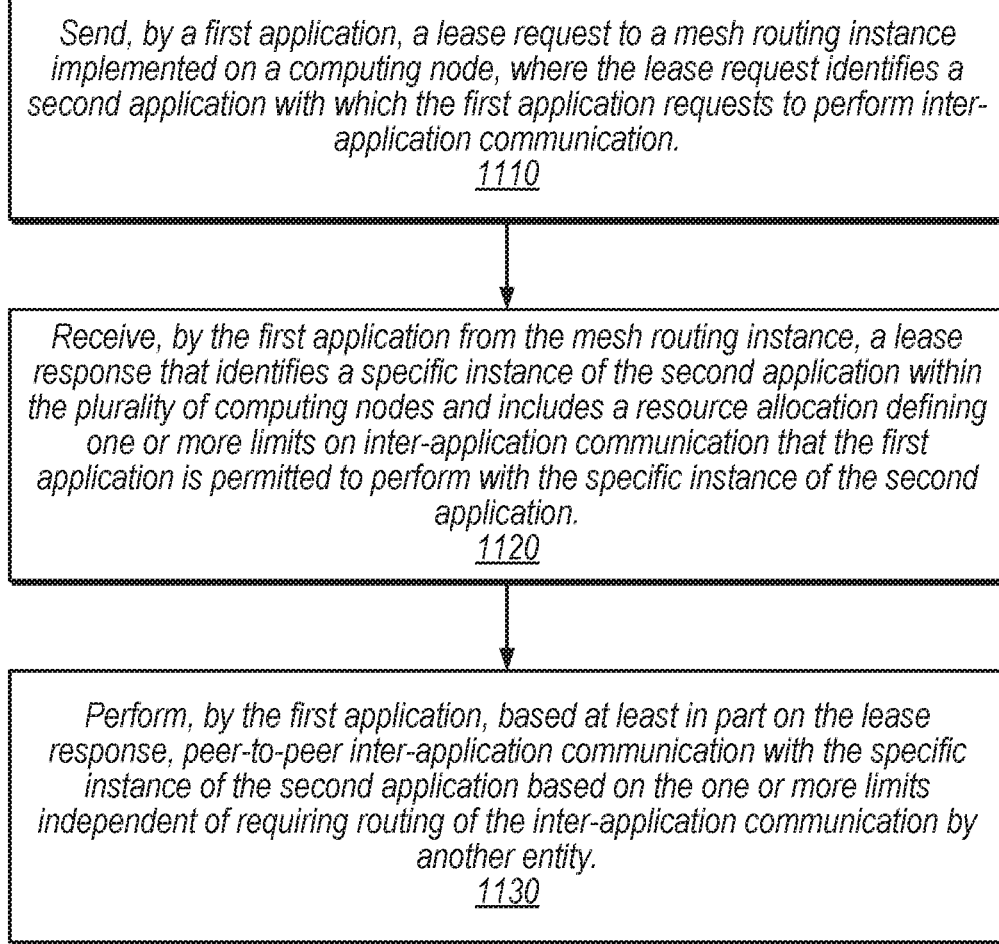
FIG. 11 is a flow diagram illustrating another example method for performing inter-application communication based on receiving one or more lease responses from a mesh routing instance, according to some embodiments.

FIG. 11 is a flow diagram illustrating another example method for performing inter-application communication based on receiving one or more lease responses from a mesh routing instance, according to some embodiments. The method shown in FIG. 11 is described with respect to features also shown in FIG. 8, but may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At element 1110, in the illustrated embodiment, a first application sends a lease request to a mesh routing instance implemented on a computing node, where the lease request identifies a second application with which the first application requests to perform inter-application communication. In some embodiments, the first application estimates resource utilization of the second application and includes a requested resource allocation in the lease request, where the requested resource allocation is determined based on estimated resource utilization. In some embodiments, the mesh routing instance intermediates communication between the first application and a central registry that maintains resource allocation information for a number of applications executing on the several computing nodes, for example as described above with respect to FIG. 8. In some embodiments, the mesh routing instance is configured to be updated independently of the first application. For example, the mesh routing instance may be implemented as a sidecar application, as discussed above, or according to a similar configuration.

At 1120 the first application receives, from the mesh routing instance, a lease response that identifies a specific instance of the second application within the computing nodes and includes a resource allocation defining one or more limits on inter-application communication that the first application is permitted to perform with the specific instance of the second application. In some embodiments, the lease request identifies a particular resource allocation requested by the first application, where the lease response is included in several distinct lease responses received via the mesh routing instance. In some embodiments, the several distinct lease responses identify respective specific instances of the second application within the computing nodes and respective portions of the particular resource allocation corresponding to the respective specific instances.

At 1130 the first application performs, based at least in part on the lease response, peer-to-peer inter-application communication with the specific instance of the second application based on the one or more limits independent of requiring routing of the inter-application communication by another entity. In some embodiments, the first application performs peer-to-peer inter-application communication with respective specific instances of the second application identified in the lease responses according to a load balancing algorithm. For example, when multiple distinct leases for the second application are issued, the first application (or a mesh routing instance on behalf of the first application) may direct requests to the multiple instances of the second application according to a load-balancing algorithm.

In some embodiments, the first application may detect that the specific instance of the second application has become inaccessible, for example by determining that no response or acknowledgement has been received within a defined period of time. In such cases, the first application may invalidate the lease response and send a new lease request to the central registry. In some embodiments, the first application may also report the inaccessible status of the specific instance of the second application to the central registry.

Figure 12:
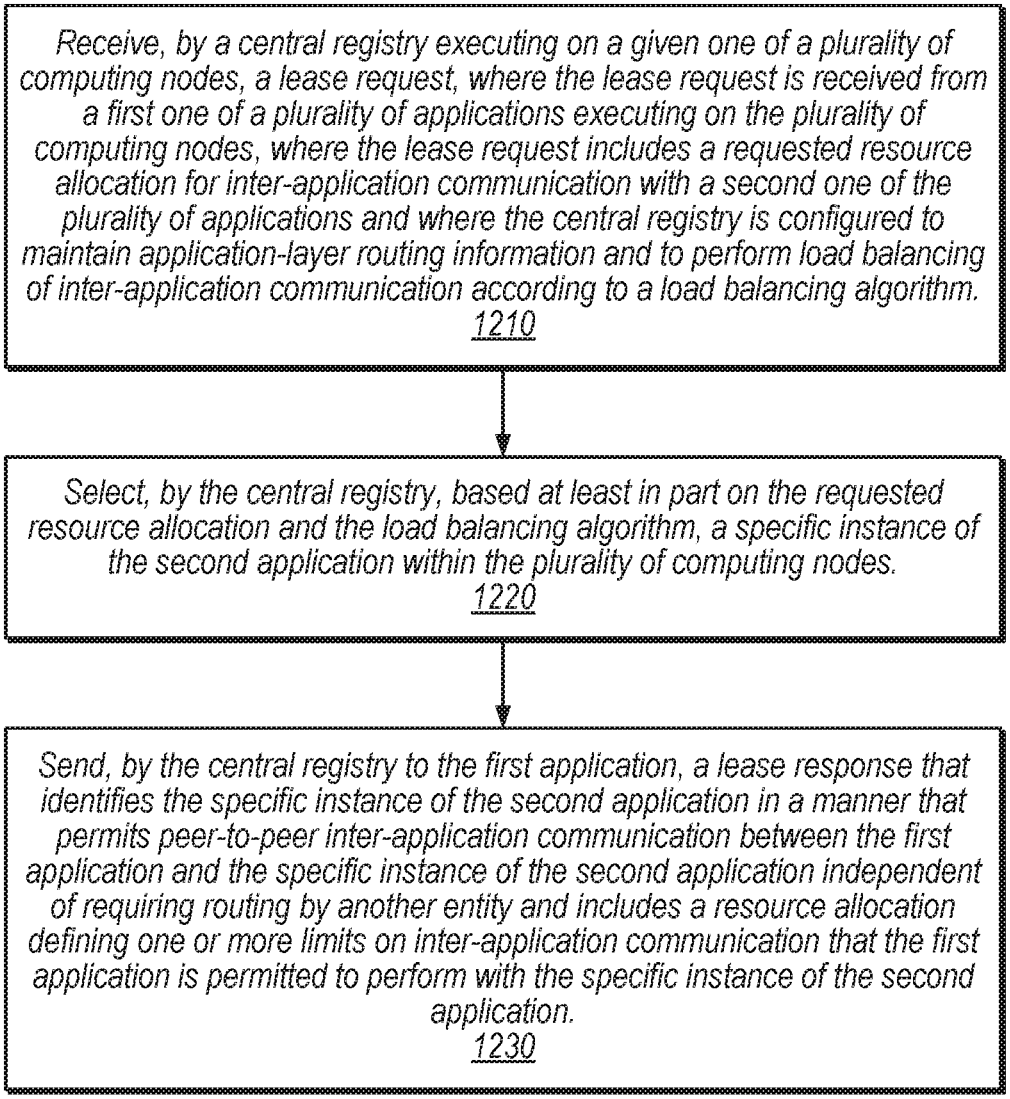
FIG. 12 is a flow diagram illustrating another example method for processing a lease request using a lease-based central registry, according to some embodiments.

FIG. 12 is a flow diagram illustrating another example of a method for processing a lease request using a lease-based central registry, according to some embodiments. The method shown in FIG. 12 is described with respect to features also shown in FIG. 8, but may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At element 1210, in the illustrated embodiment, a central registry executing on a first one of a number of computing nodes receives a lease request, where the lease request is received from a first one of a number of applications executing on the computing nodes. In some embodiments, the lease request includes a requested resource allocation for inter-application communication with a second application. In some embodiments, the central registry is configured to maintain application-layer routing information and to perform load balancing of inter-application communication according to a load balancing algorithm.

At 1220 the central registry selects, based at least in part on the requested resource allocation and the load balancing algorithm, a specific instance of the second application within the computing nodes. In some embodiments, the central registry divides the requested resource allocation among several instances of the second application including the specific instance, based on the load balancing algorithm. In some embodiments, the central registry sends, to the first application, a number of lease responses including the lease response, where the lease responses identify respective instances of the second application and respective resource allocations corresponding to the respective instance of the second application.

At 1230 the central registry sends, to the first application, a lease response that identifies the specific instance of the second application in a manner that permits peer-to-peer inter-application communication between the first application and the specific instance of the second application independent of requiring routing by another entity, and includes a resource allocation defining one or more limits on inter-application communication that the first application is permitted to perform with the specific instance of the second application. In some embodiments, receiving the lease request and sending the lease response to the first application are performed via a mesh networking instance distinct from the first application.

In some embodiments, subsequent to sending the lease response to the first application, the central registry detects that the specific instance of the second application has become inaccessible. In some embodiments, the central registry sends, to the first application, a revocation of the resource allocation included in the lease response, based on the detecting. In some embodiments, the lease response further includes a signature generated by the central registry, where the signature is configured to enable authentication of the lease response. In some embodiments, the central registry sends, to the specific instance of the second application, sufficient information from the lease response to enable the specific instance of the second application to enforce the one or more limits of the resource allocation.

Lease Authentication and Auditing

As discussed above with reference to FIG. 9B, a lease ID 934 and/or a lease signature 942 may be included in a lease response. In some embodiments, lease authentication may be performed using these parameters to ensure that a request for inter-application communication corresponds to a legitimately issued lease. Such authentication may improve system robustness, for example by reducing the likelihood that an application will attempt to utilize resources not allocated to it (either erroneously or maliciously).

In some embodiments, lease authentication is performed by a mesh instance that receives a request for inter-application directed to a corresponding application instance. For example, as described above with respect to FIG. 8, a first application instance 822A may request and receive a lease response from central registry 810. In issuing the lease, central registry 810 may sign the lease ID field using public key infrastructure (PKI) techniques or other suitable asymmetric or symmetric key authentication techniques, and provide the result in lease ID 934. When using the lease to communicate with second application instance 822B, first application instance 822A may cause the contents of lease ID 934 to be included in its communication, for example via its corresponding mesh instance 824A. Upon receiving the request, mesh instance 824B may verify that lease ID 934 is properly signed, verifying that the lease was validly issued. Upon verification, mesh instance 824B may forward the request to second application instance 822B for processing.

In another embodiment, rather than only signing lease ID 934 upon issuing the lease, central registry 810 may sign the entire lease response 930 and include the result as lease signature 942. (In some implementations, if signing the entire lease response, central registry may omit signing lease ID 934.) Rather than only providing lease ID 934 along with a communication request as just described, first application instance 822A may provide the entire lease response 930 including lease signature 942. Upon receipt, verifying lease signature 942 against lease response 930 may enable mesh instance 824B to ensure not only that the lease was validly issued, but that it is being presented by the application instance to which the lease was issued and has not been tampered with by other entities within the system.

In some embodiments, a central registry may enable the resources that have been allocated under a lease to verify or audit that they are being utilized according to the terms of the lease. For example, once first application instance 822A has a lease to perform inter-application communication with second application instance 822B, in some embodiments, first application instance 822A may be expected to comply with the terms of the lease without verification (e.g., first application instance 822A is trusted not to exceed the resource allocation it receives, to honor the expiration time of the lease, etc.). In other embodiments, however, upon issuing a lease response 930 that allocates capacity of second application instance 822B to first application instance 822A, central registry 810 may notify second application instance 822B (e.g., via its mesh instance 824B) of the lease and its terms (e.g., by forwarding lease response 930). When receiving a request for inter-application communication from first application instance 822A, mesh instance 824B may examine the request against the terms of the lease and may reject the request if it does not comply (e.g., if the lease is expired, or if the request exceeds one or more utilization limits specified in lease response 930). By enabling verification or auditing of leases by the resources allocated under the lease, system performance and stability may be improved, for example by reducing the likelihood that a rogue application instance will exceed the limits of its lease to the detriment of other applications within the system.

Example Computing Device

Figure 13:
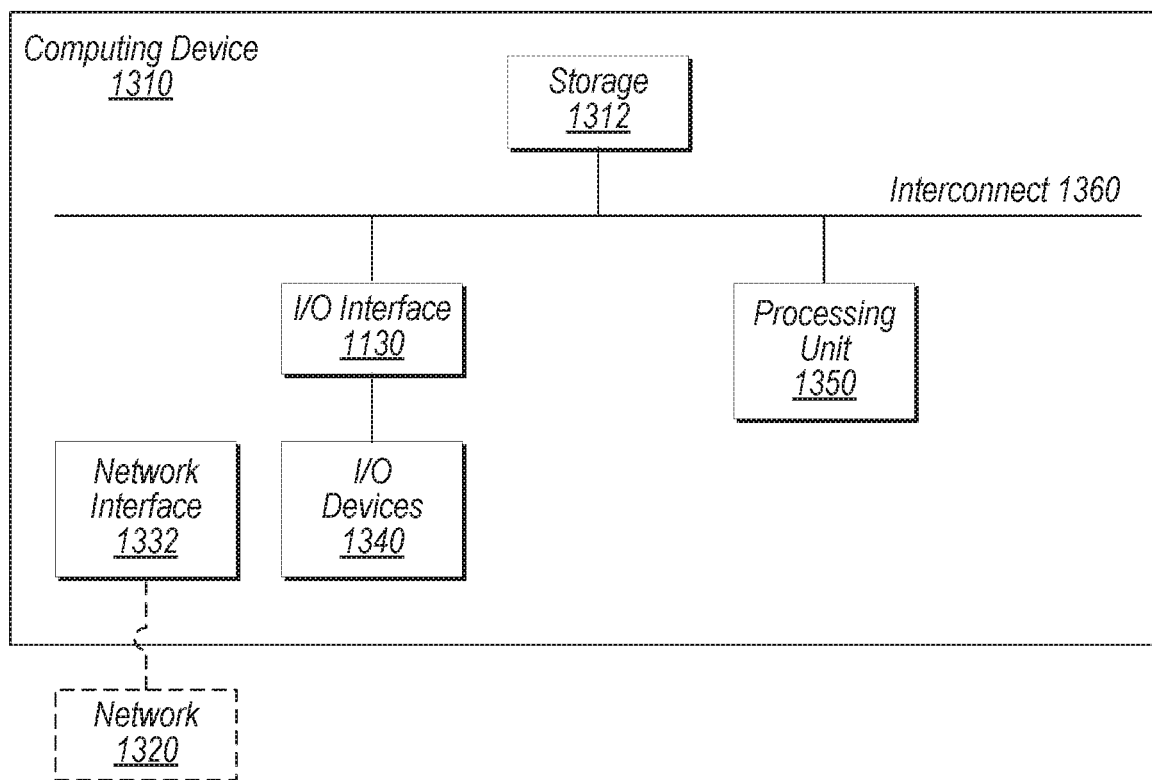
FIG. 13 is a block diagram illustrating an example computing device, according to some embodiments.

Turning now to FIG. 13, a block diagram of one embodiment of computing device (which may also be referred to as a computing system) 1310 is depicted. Computing device 1310 may be used to implement various portions of this disclosure. For example, computing device 1310 illustrates one possible configuration of a computing node. Computing device 1310 may be any suitable type of device, including, but not limited to, a personal computer system, desktop computer, laptop or notebook computer, mainframe computer system, web server, workstation, or network computer. As shown, computing device 1310 includes processing unit 1350, storage 1312, and input/output (I/O) interface 1330 coupled via an interconnect 1360 (e.g., a system bus). I/O interface 1330 may be coupled to one or more I/O devices 1340. Computing device 1310 further includes network interface 1332, which may be coupled to network 1320 for communications with, for example, other computing devices.

In various embodiments, processing unit 1350 includes one or more processors. In some embodiments, processing unit 1350 includes one or more coprocessor units. In some embodiments, multiple instances of processing unit 1350 may be coupled to interconnect 1360. Processing unit 1350 (or each processor within 1350) may contain a cache or other form of on-board memory. In some embodiments, processing unit 1350 may be implemented as a general-purpose processing unit, and in other embodiments it may be implemented as a special purpose processing unit (e.g., an ASIC). In general, computing device 1310 is not limited to any particular type of processing unit or processor subsystem.

Storage subsystem 1312 is usable by processing unit 1350 (e.g., to store instructions executable by and data used by processing unit 1350). Storage subsystem 1312 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1312 may consist solely of volatile memory, in one embodiment. Storage subsystem 1312 may store program instructions executable by computing device 1310 using processing unit 1350, including program instructions executable to cause computing device 1310 to implement the various techniques disclosed herein.

I/O interface 1330 may represent one or more interfaces and may be any of various types of interfaces configured to couple to and communicate with other devices, according to various embodiments. In one embodiment, I/O interface 1330 is a bridge chip from a front-side to one or more back-side buses. I/O interface 1330 may be coupled to one or more I/O devices 1340 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a plurality of computing nodes configured to execute instructions that implement:
      a plurality of applications configured to perform inter-application communication; and
      a central registry configured to maintain application-layer routing information and to perform load balancing of the inter-application communication;
   wherein to perform inter-application communication between a first and a second one of the plurality of applications, the first application is configured to:
      send a lease request identifying the second application to the central registry;
      receive a lease response that:
         identifies a specific instance of the second application within the plurality of computing nodes; and
         includes a resource allocation defining one or more limits on inter-application communication that the first application is permitted to perform with the specific instance of the second application; and
      based at least in part on the lease response, perform peer-to-peer inter-application communication with the specific instance of the second application based on the one or more limits independent of requiring routing of the inter-application communication by another entity.

2. The system of claim 1, wherein the lease request specifies one or more of: a name of the second application, a number of total requests the first application expects to send to the second application, a number of concurrent requests the first application expects to send to the second application, a requested lease start time, an expected lease duration, or any combination thereof.

3. The system of claim 1, wherein the lease response specifies one or more of: a name of the second application, network address information identifying the specific instance of the second application within the plurality of computing nodes, a lease identifier, a lease start time, a lease end time, a total number of requests the first application is permitted to send, a total number of concurrent requests the first application is permitted to send, a lease signature, or any combination thereof.

4. The system of claim 1, wherein the plurality of computing nodes is further configured to execute instructions to implement a plurality of mesh routing instances, and wherein to perform inter-application communication and to communicate with the central registry, the first application executing on a first one of the plurality of computing nodes is configured to communicate with a first one of the plurality of mesh routing instances executing on the first computing node.

5. The system of claim 4, wherein the first mesh routing instance is configured as a sidecar application within an application container common to the first application.

6. The system of claim 1, wherein to communicate with the second application, the first application is further configured to:
   determine that a valid lease response previously received from the central registry exists; and
   perform inter-application communication based on information in the valid lease response without submitting an additional lease request to the central registry.

7. The system of claim 6, wherein to determine that the valid lease response exists, the first application is further configured to determine that a previously received lease response has not expired and that the first application has not exceeded a resource allocation identified in the previously received lease response.

8. A non-transitory machine-readable medium having instructions stored thereon, the instructions executable by a computing node to cause performance of operations comprising:
   sending, by a first application, a lease request to a mesh routing instance implemented on the computing node, wherein the lease request identifies a second application with which the first application requests to perform inter-application communication;
   receiving, by the first application from the mesh routing instance, a lease response that:
      identifies a specific instance of the second application within a plurality of computing nodes; and
      includes a resource allocation defining one or more limits on inter-application communication that the first application is permitted to perform with the specific instance of the second application; and
   based at least in part on the lease response, performing, by the first application, peer-to-peer inter-application communication with the specific instance of the second application based on the one or more limits independent of requiring routing of the inter-application communication by another entity.

9. The non-transitory machine-readable medium of claim 8, wherein the operations further comprise:
   intermediating, by the mesh routing instance, communication between the first application and a central registry that maintains resource allocation information for a plurality of applications executing on the plurality of computing nodes.

10. The non-transitory machine-readable medium of claim 9, wherein the mesh routing instance is configured to be updated independently of the first application.

11. The non-transitory machine-readable medium of claim 8, wherein the lease request identifies a particular resource allocation requested by the first application, and wherein the lease response is included in a plurality of lease responses received via the mesh routing instance, wherein the plurality of lease responses identify respective specific instances of the second application within the plurality of computing nodes and respective portions of the particular resource allocation corresponding to the respective specific instances.

12. The non-transitory machine-readable medium of claim 11, wherein the operations further comprise:
   performing, by the first application, peer-to-peer inter-application communication with the respective specific instances of the second application identified in the plurality of lease responses according to a load balancing algorithm.

13. The non-transitory machine-readable medium of claim 8, wherein the operations further comprise:
   estimating, by the first application, resource utilization of the second application; and
   including, by the first application, a requested resource allocation in the lease request, wherein the requested resource allocation is determined based on estimated resource utilization.

14. The non-transitory machine-readable medium of claim 8, wherein the operations further comprise:
   based on determining that the specific instance of the second application has become inaccessible, invalidating, by the first application, the lease response and sending a new lease request to the mesh routing instance.

15. A computer-implemented method, comprising:
   receiving, by a central registry executing on a first one of a plurality of computing nodes, a lease request, wherein the lease request is received from a first one of a plurality of applications executing on the plurality of computing nodes, wherein the lease request includes a requested resource allocation for inter-application communication with a second one of the plurality of applications, and wherein the central registry is configured to maintain application-layer routing information and to perform load balancing of inter-application communication according to a load balancing algorithm;
   based at least in part on the requested resource allocation and the load balancing algorithm, selecting, by the central registry, a specific instance of the second application within the plurality of computing nodes; and
   sending, by the central registry to the first application, a lease response that:
      identifies the specific instance of the second application in a manner that permits peer-to-peer inter-application communication between the first application and the specific instance of the second application independent of requiring routing by another entity; and
      includes a resource allocation defining one or more limits on inter-application communication that the first application is permitted to perform with the specific instance of the second application.

16. The computer-implemented method of claim 15, further comprising:
   based on the load balancing algorithm, dividing, by the central registry, the requested resource allocation among a plurality of instances of the second application including the specific instance; and sending, by the central registry to the first application, a plurality of lease responses including the lease response, wherein the plurality of lease responses identify respective instances of the second application and respective resource allocations corresponding to the respective instance of the second application.

17. The computer-implemented method of claim 15, wherein receiving the lease request and sending the lease response to the first application are performed via a mesh networking instance distinct from the first application.

18. The computer-implemented method of claim 15, further comprising:
subsequent to sending the lease response to the first application, detecting, by the central registry, that the specific instance of the second application has become inaccessible; and
based on the detecting, sending, by the central registry to the first application, a revocation of the resource allocation included in the lease response.

19. The computer-implemented method of claim 15, wherein the lease response further includes a signature generated by the central registry, wherein the signature is configured to enable authentication of the lease response.

20. The computer-implemented method of claim 15, further comprising:
sending, by the central registry to the specific instance of the second application, sufficient information from the lease response to enable the specific instance of the second application to enforce the one or more limits of the resource allocation.

* * * * *